United States Patent
Frank et al.

(10) Patent No.: US 11,306,694 B2
(45) Date of Patent: Apr. 19, 2022

(54) METHOD FOR OPERATING AN INTERNAL COMBUSTION ENGINE HAVING AT LEAST ONE COMBUSTION CHAMBER AND INTERNAL COMBUSTION ENGINE FOR CARRYING OUT SUCH A METHOD

(71) Applicant: MTU Friedrichshafen GmbH, Friedrichshafen (DE)

(72) Inventors: Tobias Frank, Friedrichshafen (DE); Thorsten Konrad, Augsburg (DE); Aron Toth, Friedrichshafen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 16/876,182

(22) Filed: May 18, 2020

(65) Prior Publication Data
US 2020/0277927 A1     Sep. 3, 2020

Related U.S. Application Data

(63) Continuation of application No. PCT/EP2018/081621, filed on Nov. 16, 2018.

(30) Foreign Application Priority Data

Nov. 21, 2017   (DE) ...................... 10 2017 220 801.5

(51) Int. Cl.
  *F02P 5/152*   (2006.01)
  *F02D 35/02*   (2006.01)
  *G01L 23/22*   (2006.01)

(52) U.S. Cl.
  CPC ............ *F02P 5/152* (2013.01); *F02D 35/027* (2013.01); *G01L 23/221* (2013.01)

(58) Field of Classification Search
  CPC ........... F02D 2041/001; F02D 41/0002; F02D 13/0215; F02D 13/0261; F02D 13/0219
  See application file for complete search history.

(56) References Cited

U.S. PATENT DOCUMENTS

| | | | |
|---|---|---|---|
| 4,012,942 A | 3/1977 | Harned | |
| 5,762,045 A * | 6/1998 | Pockstaller | ............. G01L 23/16 |
| | | | 123/406.28 |

(Continued)

FOREIGN PATENT DOCUMENTS

| | | |
|---|---|---|
| DE | 39 17 905 A1 | 12/1990 |
| DE | 10 2004 036 502 A1 | 4/2006 |

(Continued)

OTHER PUBLICATIONS

210512 DE 10 2004 036502 machine translate (Year: 1904).*

(Continued)

*Primary Examiner* — Carl C Staubach
(74) *Attorney, Agent, or Firm* — Taylor IP, P.C.

(57) ABSTRACT

A method for operating an internal combustion engine. The method includes detecting a structure borne sound signal in a time-dependent manner for the at least one combustion chamber during operation of the internal combustion engine, and determining, in a predetermined measuring window, at least one evaluation parameter from the detected structure borne sound signal. The method also includes obtaining at least one comparative result by comparing the at least one evaluation parameter with at least one predetermined comparison value, and assigning to the structure borne sound signal, on the basis of the at least one comparative result, one of a knocking event in the at least one combustion chamber and an interference signal.

18 Claims, 1 Drawing Sheet

(56) References Cited

U.S. PATENT DOCUMENTS

| | | | |
|---|---|---|---|
| 7,559,230 B2 | 7/2009 | Zimmer | |
| 9,625,343 B2 | 4/2017 | Fischer et al. | |
| 9,970,373 B1* | 5/2018 | Arbuckle | F02D 37/02 |
| 2001/0042398 A1* | 11/2001 | Sloboda | F02D 41/222 |
| | | | 73/35.04 |
| 2010/0229624 A1* | 9/2010 | Higuchi | G01L 23/225 |
| | | | 73/1.57 |
| 2010/0242912 A1* | 9/2010 | Folkerts | G01L 23/225 |
| | | | 123/435 |
| 2011/0077846 A1* | 3/2011 | Zavala Jurado | F02D 35/027 |
| | | | 701/111 |
| 2016/0245215 A1* | 8/2016 | Bizub | G01L 23/226 |

FOREIGN PATENT DOCUMENTS

| | | |
|---|---|---|
| DE | 10 2006 001 367 A1 | 2/2007 |
| DE | 10 2013 215 924 A1 | 2/2015 |
| DE | 10 2015 105 220 B3 | 9/2016 |

OTHER PUBLICATIONS

International Search Report, including an English translation, dated Feb. 28, 2019 for International Application No. PCT/EP2018/081621 (8 page).

Written Notice from the International Search Authority dated Feb. 28, 2019 for International Application No. PCT/EP2018/081621 (6 pages).

Mohammad Momeni Mov Ahed et al. "Normalized Knock Intensity Determination Based on the Knock Sensor Analysis to Have a Fixed Detection Threshold at Different Operating Conditions", Journal of Engineering for Gas Turbines and Power, US, vol. 138, No. 6, Jun. 1, 2016, p. 061501-1 (01 pages).

\* cited by examiner

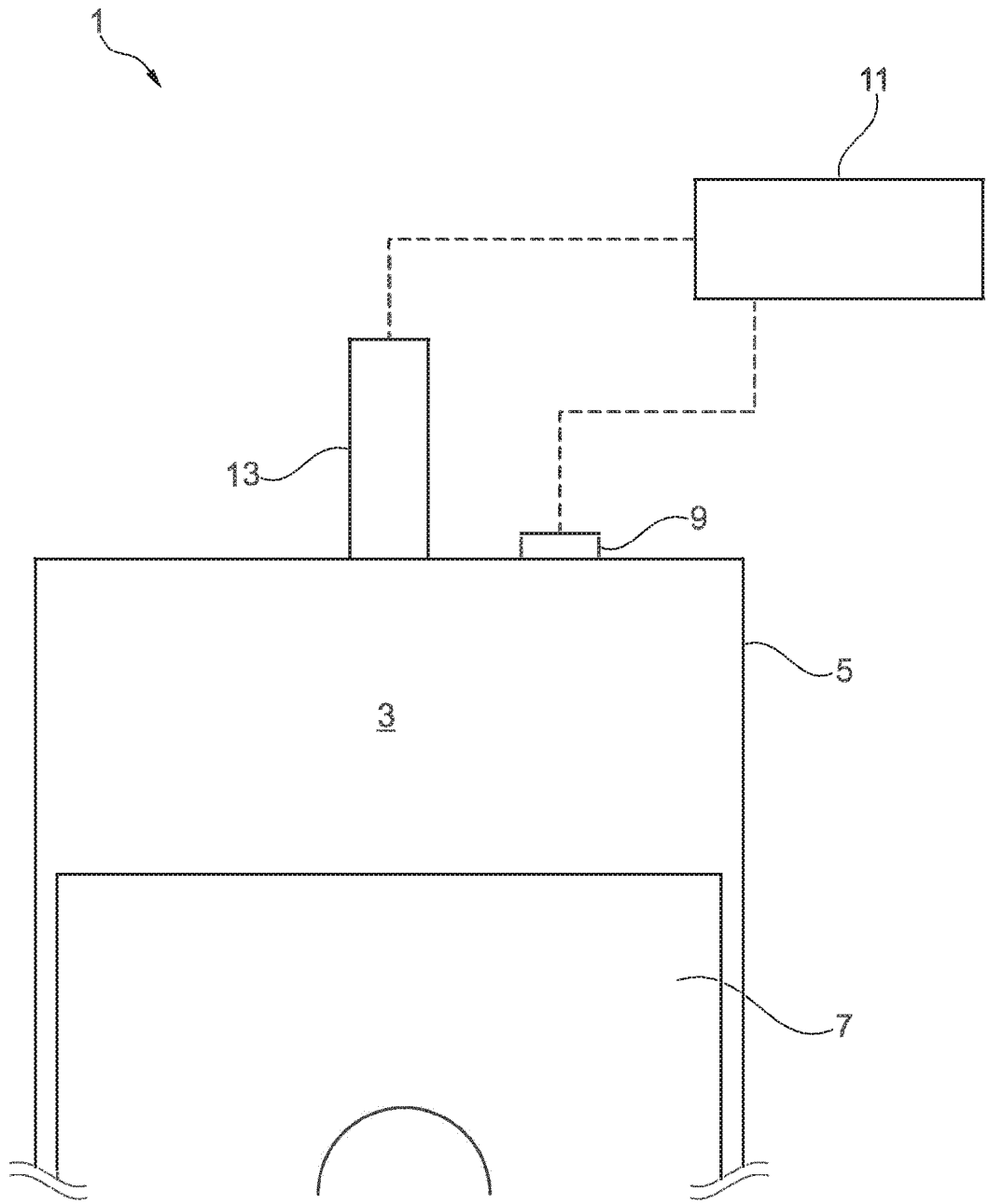

METHOD FOR OPERATING AN INTERNAL COMBUSTION ENGINE HAVING AT LEAST ONE COMBUSTION CHAMBER AND INTERNAL COMBUSTION ENGINE FOR CARRYING OUT SUCH A METHOD

CROSS REFERENCE TO RELATED APPLICATIONS

This is a continuation of PCT application No. PCT/EP2018/081621, entitled "METHOD FOR OPERATING AN INTERNAL COMBUSTION ENGINE HAVING AT LEAST ONE COMBUSTION CHAMBER AND INTERNAL COMBUSTION ENGINE FOR CARRYING OUT SUCH A METHOD", filed Nov. 16, 2018, which is incorporated herein by reference.

BACKGROUND OF THE INVENTION

1. Field of the Invention

The present invention relates to a method for operating an internal combustion engine, and further to an internal combustion engine which is constructed to be operated with such a method.

2. Description of the Related Art

DE 10 2013 215 924 A1 discloses a method is known for operating an internal combustion engine, wherein combustion chambers of the internal combustion engine are monitored in regard to knocking events, wherein the start of the injection process and thus also an ignition point for a cylinder for which a knocking event is detected is incrementally delayed until knocking at the cylinder ceases. It is also generally known to detect such knocking events from structure borne sound signals which can be detected in particular by way of knock sensors. However, during operation of an internal combustion engine interference signals also occur in the form of structure borne sound vibrations which do not stem from knocking events. For example, in the upper ignition dead center in an internal combustion engine designed as a reciprocating piston engine, changes of the individual pistons occur when the latter are acted on, on the one hand by the load change in the rod-piston connection and on the other hand by the combustion chamber pressure. Such changes lead to structure born sound vibrations and consequently to structure born sound signals which can be detected in particular by way of structure born sound sensors, for example knock sensors which are positioned within a temporal measuring window of the knock control. In regard to their temporal occurrence these interference signals can thus not be separated from knocking events. In addition, the interference signals can contain the same frequency components as do structure borne sound signals generated by knocking events, so that also no frequency filtering is possible for discrimination of the various signals. If the interference signals exceed a certain level they are erroneously interpreted as knocking, wherein then measures to prevent knocking are adopted by the knock control. This has negative effects on the operation of the internal combustion engine: on the one hand its efficiency is reduced and on the other hand the introduced counter measures do not reduce the occurring interference, so that the control ultimately runs into its limits and in the worst case scenario shuts off the internal combustion engine by way of an emergency stop in order to assure the presumed protection thereof.

What is needed in the art is a method for operating an internal combustion engine as well as an internal combustion engine, wherein the aforementioned disadvantages do not occur.

SUMMARY OF THE INVENTION

The present invention provides a method for operating an internal combustion engine which has at least one combustion chamber, wherein during operation of the internal combustion engine a structure borne sound signal is detected in a time-dependent manner for the at least one combustion chamber. In a predetermined, in particular temporal measuring window at least one evaluation parameter—which in particular is not a signal amplitude of the structure borne sound signal—is determined, in particular calculated from the detected structure borne sound signal, wherein the at least one evaluation parameter is compared with at least one predetermined comparison value, from which at least one comparative result is obtained. On the basis of the comparative result either a knocking event in the combustion chamber or an interference signal is assigned to the structure borne sound signal. This approach is based on the knowledge that, for example interference signals generated by system changes can be separated in the measuring window from knocking events by introducing a metric which is applied to an evaluation parameter determined from the structure borne sound signal. By comparing the evaluation parameter with the comparison value, a metric is created which permits distinguishing between knocking events and interference signals. It is thus possible to significantly reduce the relative proportion of the false-positive detected knocking events, or to even avoid false-positive detected knocking events, thereby rendering the overall operation of the internal combustion engine more effectively and more economically, and as a result to increase the rate of efficiency of the internal combustion engine and avoid emergency stop events.

The fact that the structure borne sound signal is detected in a time-dependent manner implies that it is explicitly detected in a time-dependent manner. In addition, or alternatively it is also possible that the structure borne sound signal is detected depending on a crankshaft angle, that is to say in degrees of crankshaft angle (° KW). It is also possible that the structure borne sound signal is initially detected with explicit time-dependency—in particular with a specific resolution—and is then converted or transformed in a rotational speed dependent manner into a structure borne sound signal that is dependent upon the crankshaft angle. Through the current rotational speed there is a clear dependency between the time on the one hand and the crankshaft angle on the other hand.

It is possible that the structure borne sound signal is detected only in the predetermined measuring window. It is however also possible that the structure borne sound signal is being detected continuously and is evaluated only within the predetermined measuring window, at least in regard to a possible knocking event.

The predetermined measuring window can be defined by a specific crankshaft angle range which may comprise the upper ignition dead center (ignition OT). Specifically, it is also possible that the predetermined measuring window—expressed in degrees of crankshaft angle—extends from 25° KW before the ignition OT to 55° KW after the ignition OT, that is to say from −25° KW to +55° KW if the ignition OT is specified by convention as being 0° KW, whereby the predetermined measuring window preferably extends from −20° KW to +50° KW, preferably from −15° KW to +45° KW, preferably from −10° KW to +40° KW, preferably from −5° KW to +35° KW, preferably from −2° KW to +30° KW, preferably from −1° KW to +25° KW.

The at least one evaluation parameter may be determined from the detected structure borne signal only if the latter exceeds a predetermined limiting amplitude maximum, thus a predetermined level with a maximum within the predetermined measuring window. This limiting amplitude maximum may be selected so that a knocking event can be excluded, at least with high probability if the limiting amplitude maximum is not exceeded. No further evaluation of the structure borne signal is then necessary, so that the computing time associated herewith and thus also the corresponding costs can be saved. It is therefore preferably first verified whether the structure born sound signal in the predetermined measuring window exceeds the predetermined limiting amplitude value, wherein the subsequent process steps are implemented only if this is actually the case. To this extent it has also been shown that the predetermined limiting amplitude value is not sufficient to reliably separate knocking events from interference signals.

It is possible that a plurality of evaluation parameters is determined from the detected structure borne sound signal. The different evaluation parameters are then used to differentiate between knocking events and interference signals, wherein a predetermined comparison value is especially preferably provided for each evaluation parameter, wherein each evaluation parameter is compared with the respectively assigned comparison value. The same number of comparative results are then obtained as the number of evaluation parameters used. The decision, as to whether a knocking event or a interference signal is present is then reached preferably in the sense of a majority decision. Thus, a knocking event is recognized if the plurality of the comparative results suggests same, wherein the minority of the comparative results favors an interference signal. Conversely, an interference signal is recognized if the plurality of the comparative results suggests same, wherein the minority of the comparative results is characteristic of a knocking event. In this manner, the reliability of differentiation between knocking events on the one hand and interference signals on the other hand can be further increased, wherein especially the proportion of false-positive detected knocking signals is also reduced.

A further advancement of the invention provides that at least one knocking prevention measure is implemented if a knocking event is assigned to the structure borne sound signal. Conversely, no knocking prevention measures are preferably implemented if an interference signal is assigned to the structure borne sound signal. In this manner, the unnecessary introduction of a knocking prevention measure which is also detrimental for the efficiency rate of the internal combustion engine is prevented if an interference signal is assigned to the structure borne sound signal. In a knocking prevention measure, an ignition time, in particular an injection time and/or an ignition time for the at least one combustion chamber is delayed, in other words is moved closer to the upper ignition dead center. In this way, knocking in the at least one combustion chamber can be reduced, thereby preserving the internal combustion engine. The ignition time can be again advanced if no further knocking events occur.

Another advancement of the invention provides that the structure borne sound signal is detected by way of a knock sensor. Knock sensors have proved to be extremely robust and durable and are in addition cost effective. It is possible that a knock sensor is allocated to each combustion chamber of the internal combustion engine—provided the combustion engine has a plurality of combustion chambers. It is however also possible that one common knock sensor is assigned to several combustion chambers of the internal combustion engine. This is easily possible because the various predetermined measuring windows for the different combustion chambers are time separated. It is in particular possible that the internal combustion engine has only one common knock sensor for all combustion chambers, or that the internal combustion engine has separate knock sensors for different combustion chamber groups, for example one knock sensor respectively for each cylinder bank.

Alternatively, it is also possible that the structure borne sound signal is detected by way of a combustion chamber pressure sensor. In particular if the internal combustion engine already has a combustion chamber pressure sensor, for example for pressure indexing in the at least one combustion chamber, the pressure sensor can in addition also be used advantageously to detect the structure borne sound signal.

A further development of the invention provides that an energy parameter of the structure borne sound signal is determined in the predetermined measuring window as an evaluation parameter. An energy parameter is understood herein to be a parameter which is characteristic for the energy contained in the structure borne sound signal inside the predetermined measuring window. In this respect it has turned out that knock events on the one hand and interference signals—in particular interference signals due to change of a piston—on the other hand separate on the energy scale from each other, at least to such an extent that a differentiation on the basis of an energy parameter is possible. Structure borne sound signals stemming from knock events typically have higher energy than interference signals. When imaging statistic frequencies of knocking events on the one hand and interference signals on the other hand over the energy scale it is shown that certainly the maxima of the two distribution curves are clearly separated from one another. It is thus possible to establish a value of the energy parameter as a predetermined comparison value, above which the structure borne sound signal is caused with high probability by a knocking event, wherein below the value an interference signal can be assigned with high probability to the structure borne sound signal. By way of this approach the proportion of false-positive detected knocking events can be significantly reduced based on a comparison state, without carrying out the method.

Additionally or alternatively, a duration of a signal curve progression of the structure borne sound signal may be determined as an evaluation parameter in the predetermined measuring window.

A signal curve progression of the structure borne sound signal is understood to be the progression from a defined starting value to a specific end value inside the predetermined measuring window, wherein the defined starting value and the specific end value are selected such that a peak of the structure borne sound signal occurs in the interval between the defined starting value and the specific end value. The signal curve progression is considered in particular originating from a first signal threshold value of the structure borne sound signal to a second signal threshold value, wherein the length of time between a time index value assigned to the first signal threshold value and a time index value assigned to the second signal threshold value is calculated. In this respect it has been found that structure borne sound signals caused by knocking events on the one hand and interference signals on the other hand also clearly separate from one another on a temporal length scale, wherein structure borne sound signals that are traced back to knocking events have a significantly longer signal curve progression than interference signals. In considering corresponding frequency distributions over the length scale it is also revealed that the maximum frequency distributions for the structure borne sound signals tracing back to knocking events on the one hand and interference signals on the other hand are clearly separated from one another. It is thus also possible to select a suitable temporal length value as a predetermined comparison value, wherein a knocking event can be detected with high reliability if the temporal length of the signal curve progression is longer than the predetermined length value and wherein an interference signal is recognized if the temporal length is shorter than the predetermined length value. In this manner the proportion of false-positive detected knocking signals can be significantly reduced based on a comparative state, without carrying out the method.

Alternatively or additionally it is provided that, as the evaluation parameter a signal shape value of the structure borne sound signal is defined in the predetermined measuring window. The signal shape value is herein especially characteristic for a shape of the signal curve progression of the structure borne sound signal. It has been found that a good differentiation between knocking and interference signals is possible on the basis of the signal shape.

At least two evaluation parameters, for example the energy parameter on the one hand and the temporal length of the signal curve progression on the other hand are especially preferably used cumulatively. A knocking event is especially preferably recognized if the comparative results which are assigned to the two evaluation parameters indicate a knocking event, whereas an interference signal is recognized if only one of the two comparative results or no comparative result indicate/indicates a knocking event. It is also possible to use all evaluation parameters cumulatively. The accuracy of the method can thus be further increased by linking of the evaluation parameters.

According to a further development of the method, a threshold value is used as the comparison value, wherein a knocking event in the combustion chamber is assigned to the structure borne sound signal if the evaluation parameter is greater than the threshold value and wherein an interference signal is assigned to the structure borne sound signal if the evaluation parameter is smaller than the threshold value. In this manner in particular, at least one explicit metric can be provided for evaluation of the structure borne sound signal. As previously pointed out, different metrics are preferably applied which are used cumulatively for discrimination of knock events on the one hand and interference signals on the other hand.

The comparison value can be determined in bench tests. It is possible in bench tests to distinguish in various ways between a knocking combustion and an interference signal. It is thus possible to develop frequency distributions—in particular in the form of histograms—of knocking events on the one hand and interference signals on the other hand for evaluation parameters. When the frequency distributions of interference signals on the one hand and knocking events on the other hand clearly separate for an evaluation parameter, a suitable comparison value can be established on the scale of the evaluation parameter in order to ensure as reliable a distinction as possible.

A further development of the invention provides that the energy parameter is determined in that the structure borne sound signal—possibly only inside the predetermined measuring window—is squared, wherein the squared structure borne sound signal is integrated over the predetermined measuring window. In this way an index number is obtained which is characteristic at least for the energy contained in the structure borne sound signal.

The temporal length of the signal curve progression may be determined as follows: The structure borne sound signal is squared—possibly only inside the predetermined measuring window—wherein the squared structure borne sound signal is standardized with a maximum (peak value) of the squared structure borne sound signal inside the predetermined measuring window. This occurs in particular in that the maximum of the squared structure borne sound signal is determined inside the predetermined measuring window and that subsequently the squared structure borne sound signal overall, that is to say, at each point of the signal curve is divided by the determined maximum of the squared structure borne sound signal. All squared structure borne sound signals are thus standardized to a maximum value of 1. For the standardized squared structure borne sound signal a first time index value is determined in the measuring window at a first signal threshold value, wherein a second time index value is determined at a later stage at a second signal threshold value. The first signal threshold value and the second signal threshold value may be defined as percentage threshold values of the maximum of the squared signal curve progression. It is possible that the first signal threshold value and the second signal threshold value are selected to be the same. It is however also possible that different values are used for the first signal threshold value on the one hand and the second signal threshold value on the other hand.

As the first time index value the point in time or the crankshaft angle are used at which the first signal threshold value is first reached—prior to passing through the maximum—wherein as the second time index value that point in time or the crankshaft angle is determined at which the second signal threshold value—after passing through the maximum—is reached. The difference between the second time index value and the first time index value is calculated as the temporal length.

The temporal length may be calculated in ° KW. If the time index values are captured as points in time because the structure borne sound signal is also detected in an explicitly time-dependent manner, the temporal length may be calculated in that the difference in the time index values is multiplied with the resolution of the detection of the structure borne sound signal in ° KW—in particular depending on a momentary rotational speed of the internal combustion engine.

The signal shape value may be determined as follows: The structure borne sound signal is squared, possibly only inside the predetermined measuring window. The squared structure borne sound signal is standardized with a maximum (peak value) of the squared structure borne sound signal inside the predetermined measuring window. The standardization occurs in the same manner as explained for the determination of the temporal length. The standardized squared structure borne sound signal is integrated over the predetermined measuring window. In this way, the signal shape value is obtained as a measurement number which is characteristic for the signal shape. With the exception of the standardization, the signal shape value is thereby formed in a manner analogous to the energy parameter.

According to a further development of the invention it is provided that the structure borne sound signal is filtered prior to squaring, in particular when determining the energy parameter and also when determining the temporal length of the signal curve progression and also when determining the signal shape value. Herein, interferences can in particular be eliminated which—in regard to the frequency band in which they occur—can be separated from the frequency band in which structure borne sound signals which are traceable to knocking events occur.

The objective is also met in that an internal combustion engine is created which is designed to carry out a method according to the invention or a method according to one of the previously described embodiments. In connection with the internal combustion engine advantages are in particular realized which have already been explained in connection with the method.

The internal combustion engine has, in particular a control unit which is designed to carry out the method. It is therein possible that a separate control unit is provided for implementation of the method. However, the method is especially preferably implemented by a central engine control unit (ECU) of the internal combustion engine. Predetermined comparison values which were determined in particular in bench tests are preferably stored as threshold values in the control unit.

The internal combustion engine may have one knock sensor which is designed to detect structure borne sound signals wherein the knock sensor is also operatively connected with the control unit for transmission to the control unit of structure borne sound signals which were captured by the knock sensor.

The internal combustion engine may be designed as a reciprocating piston engine. It is possible that the internal combustion engine is designed to drive a passenger vehicle, a truck or a commercial vehicle. In one embodiment, the internal combustion engine serves to drive in particular heavy land vehicles or water craft for example mining vehicles, trains, wherein the internal combustion engine is used in a locomotive or in a railcar, or ships. Use of the internal combustion engine in military vehicles, for example tanks is also possible. One embodiment of the internal combustion engine is preferably also used in a stationary application, for example for stationary energy supply in emergency power operations, continuous load operation or peak load operation, wherein the internal combustion engine in this case preferably powers a generator. A stationary application of the internal combustion engine for powering of auxiliary equipment, for example fire pumps on drilling platforms is also possible. Application of the internal combustion engine is moreover possible in mining of fossil raw materials and in particular fuels, for example oil and/or gas. Utilization of the internal combustion engine in the industrial sector or in construction is also possible, for example in construction machinery, for example in a crane or an excavator. The internal combustion engine is preferably designed as a gasoline engine, as a gas engine for operation with natural gas, biogas, specialty gas or another suitable gas, or as a two substance engine, in particular a dual fuel engine, in particular for operation with gasoline and diesel and/or with gas and diesel. In particular, if the internal combustion engine is designed as a gas engine, it is suitable for use in a cogeneration unit for stationary power generation.

The invention also comprises a computer program product which contains instructions, based on which an inventive method, or a method according to one of the previously described design forms is implemented if the computer program product runs on a processor, in particular a controller in an internal combustion engine.

The invention also comprises a data medium which includes such a computer program product, or respectively on which such a computer program product is stored.

The descriptions of the method on the one hand and of the internal combustion engine on the other hand are to be understood to be complimentary to one another. Features of the internal combustion engine which were explained explicitly in the context of the method are preferably individual or combined features of an embodiment of the internal combustion engine. Method steps which were explained explicitly in the context of the internal combustion engine are preferably individual or combined steps of an embodiment of the method. The method is characterized preferably by at least one step which is contingent on at least one feature of the inventive embodiment of the internal combustion engine. The internal combustion engine is preferably characterized by at least one feature that is contingent on at least one step of an inventive embodiment of the method.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein:

FIG. 1 is a schematic representation of one embodiment of an internal combustion engine.

The exemplification set out herein illustrates an embodiment of the invention, in one form, and such exemplification is not to be construed as limiting the scope of the invention in any manner.

DETAILED DESCRIPTION OF THE INVENTION

Referring now to the drawings, and more particularly to FIG. 1, there is shown a schematic representation of an internal combustion engine 1. The internal combustion engine 1 is designed to carry out a method for operating the internal combustion engine 1. The internal combustion engine 1 has at least one combustion chamber 3 which herein is defined on the one hand by a cylinder wall 5 and on the other hand by a piston 7 which is located inside cylinder wall 5 and which is movable repetitively relative to cylinder wall 5. Internal combustion engine 1 can be designed as a reciprocating piston engine.

The internal combustion engine 1 may have a plurality of combustion chambers 3. It is in particular possible that the internal combustion engine 1 has four, six, eight, ten, twelve, fourteen, sixteen, eighteen or twenty combustion chambers 3. However, other and/or greater numbers of combustion chambers are also possible.

Here, a knock sensor 9 is assigned to combustion chamber 3 which is designed to detect structure borne sound signals. It is possible that one such knock sensor 9 is assigned respectively to each combustion chamber 3 of internal combustion engine 1. It is however also possible that combustion engine 1 has fewer knock sensors 9 than combustion chambers 3. In particular, the internal combustion engine 1 could have only one knock sensor 9, or various knock sensors 9 which would respectively be assigned to different combustion chamber groups, for example one knock sensor 9 per each cylinder bank.

Knock sensor 9 is operatively connected with a controller 11, so that structure borne sound signals detected by knocking sensor 9 can be processed in controller 11. Controller 11 in turn is operatively connected with an ignition device 13 so that an ignition time point—that is to say the start of a chemical combustion reaction in combustion chamber 3—can be conveyed by controller 11 and specified via ignition device 13. Ignition device 13 may be a fuel injector, in particular an ignition oil injector, a spark plug or other suitable device to specify an ignition point in time. By way of a suitable control of ignition device 13, controller 11 can carry out knock prevention measures if a knocking combustion is detected in combustion chamber 3.

Knock sensor 9 detects structure borne sound signals, which are evaluated—in regard to the occurrence of a knock event—in a predetermined temporal measuring window associated with combustion chamber 3. When exceeding a certain level, in particular a limit amplitude value, interference signals, for example due to a change of piston 7 on cylinder wall 5 can erroneously be identified as knocking signals, that is to say as structure borne sound signals traced back to a knocking event. Such interference signals cannot be separated from knocking events, either in time or in the frequency spectrum.

In order to nevertheless be able to reliably distinguish between knocking events and interference signals it is provided within the scope of a method for operating internal combustion engine 1, that for combustion chamber 3 during operation of internal combustion engine 1 a structure dependent sound signal is detected in a time-dependent manner by knock sensor 9, wherein from the captured knock signal at least one evaluation parameter is established, in particular calculated in the predetermined measuring window. The at least one evaluation parameter is then compared with at least one predetermined comparison value, wherein the predetermined comparison value is preferably firmly stored in controller 11. In particular, a separate predetermined comparison value is stored for each evaluation parameter used within the scope of the method. The comparison values can be established in advance in test bench trials, wherein it is possible due to various measurements and/or criteria to differentiate in test bench trials between knock events and interference signals. From the comparison between the evaluation parameter and the comparison value at least one comparative result is obtained and based on the comparative result, a knock event in combustion chamber 3 or an interference signal is assigned to the structure borne sound signal. By way of the predetermined comparison value and its comparison with the evaluation parameter a metric is provided, by way of which it is possible to distinguish between knock events on the one hand and interference signals on the other hand.

A plurality of evaluation parameters may be determined. Each evaluation parameter is compared respectively with a predetermined comparison value assigned to it. In this manner, a plurality of comparative results is obtained. In other words, the comparative results are determined by comparing the evaluation parameters and the predetermined comparison values. The decision as to whether a knock event or an interference signal are present is then made preferably in the sense of a majority decision, wherein a knock result is recognized in particular when a plurality of comparative results indicates such. If however the plurality of the comparative results indicates an interference signal or if the same number of comparative results appear in favor of a knocking event as appear in favor of an interference signal, a decision is preferably made in favor of an interference signal.

If a knocking event is assigned to the structure borne sound signal, at least one knocking prevention measure is implemented, by controller 11. For this purpose, an ignition point in combustion chamber 3 may be delayed by way of suitable control of ignition device 13.

An energy parameter and/or a signal shape value and/or a temporal length of a signal curve progression of the structure borne sound signal is/are may be established as an evaluation parameter in the predetermined measuring window.

A threshold value can be used as the comparison value, wherein a knocking signal is assigned to the structure borne sound signal if the evaluation parameter is greater than the comparison value, wherein an interference signal is assigned to the structure borne sound signal, if the evaluation parameter is smaller than the comparison value.

The energy parameter may be determined in that the structure borne sound signal is squared, wherein the squared structure borne sound signal is integrated over the predetermined measuring window.

The temporal length of the signal curve progression may be determined in that the structure borne sound signal is squared, wherein the squared structure borne sound signal is standardized with a maximum of the squared structure borne sound signal inside the predetermined measuring window. For the standardized and squared structure borne sound signal a first time index value is determined in the measuring window at a first signal threshold value, wherein a second time index value is determined at a later stage at a second signal threshold value, wherein the temporal length is then calculated as difference between the second time index value and the first time index value.

The signal shape value may be determined in that the structure borne sound signal is squared, wherein the squared structure borne sound signal is standardized with a maximum of the squared structure borne sound signal inside the predetermined measuring window and wherein the standardized and squared structure borne sound signal is integrated over the predetermined measuring window.

The structure borne sound signal may be filtered prior to being squared.

With the herein suggested method and internal combustion engine 1 it is possible to prevent an unnecessary reduction in efficiency and performance of the internal combustion engine, as well as an emergency stop due to multiple false-positive detected knocking events.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating an internal combustion engine, the internal combustion engine including at least one combustion chamber, the method comprising:
    detecting a structure borne sound signal in a time-dependent manner for the at least one combustion chamber during operation of the internal combustion engine;

determining, in a predetermined measuring window, at least one evaluation parameter from the detected structure borne sound signal, the at least one evaluation parameter including
a temporal length of a signal curve progression, the temporal length, which is irrespective of an output wave of a cylinder internal pressure sensor, being associated with a single sensor for detecting the structure borne sound signal and being calculated as a difference between a second time index value and a first time index value;
obtaining at least one comparative result by comparing the at least one evaluation parameter with at least one predetermined comparison value; and
assigning to the structure borne sound signal, on the basis of the at least one comparative result, one of a knocking event in the at least one combustion chamber and an interference signal.

2. The method according to claim 1, further comprising a step of implementing at least one knocking prevention measure if the knocking event is assigned to the structure borne sound signal.

3. The method according to claim 1, wherein the internal combustion engine further includes a knock sensor, the knock sensor is configured for detecting the structure borne sound signal.

4. The method according to claim 1, wherein the at least one predetermined comparison value is at least one threshold value.

5. The method according to claim 4, wherein a knocking signal is assigned to the structure borne sound signal if the at least one evaluation parameter is greater than the at least one predetermined comparison value, and wherein an interference signal is assigned to the structure borne sound signal if the at least one evaluation parameter is smaller than the at least one predetermined comparison value.

6. The method according to claim 1, wherein the at least one evaluation parameter includes an energy parameter, which is characteristic for an energy contained in the structure borne sound signal, wherein the energy parameter is determined in that the structure borne sound signal is squared, wherein the squared structure borne sound signal is integrated over the predetermined measuring window.

7. The method according to claim 6, wherein the temporal length of the signal curve progression of the structure borne sound signals is determined in that the structure borne sound signal is squared.

8. The method according to claim 7, wherein the squared structure borne sound signal is standardized with a maximum of the squared structure borne sound signal inside the predetermined measuring window.

9. The method according to claim 8, wherein for the standardized and squared structure borne sound signal the first time index value is determined in the measuring window at a first signal threshold value, and wherein a second time index value is determined at a later stage at the second signal threshold value, the temporal length being longer than a predetermined comparative temporal length value when a knocking event occurs.

10. The method according to claim 1, wherein the at least one evaluation parameter includes a signal shape value of the structure borne sound signal, the signal shape value being associated with a single sensor for detecting the structure borne sound signal, wherein the signal shape value is determined in that the structure borne sound signal is squared, wherein the squared structure borne sound signal is standardized with a maximum of the squared structure borne sound signal inside the predetermined measuring window.

11. The method according to claim 10, wherein the standardized and squared structure borne sound signal is integrated over the predetermined measuring window.

12. The method according to claim 1, wherein the structure borne sound signal is filtered prior to a squaring of the structure borne sound signal.

13. An internal combustion engine, comprising:
at least one combustion chamber;
at least one ignition device connected to the at least one combustion chamber; and
a controller operably connected to the at least one ignition device, the controller being configured for:
detecting a structure borne sound signal in a time-dependent manner for the at least one combustion chamber during operation of the internal combustion engine;
determining, in a predetermined measuring window, at least one evaluation parameter from the detected structure borne sound signal, the at least one evaluation parameter including:
a temporal length of a signal curve progression, the temporal length, which is irrespective of an output wave of a cylinder internal pressure sensor, being associated with a single sensor for detecting the structure borne sound signal and being calculated as a difference between a second time index value and a first time index value;
obtaining at least one comparative result by comparing the at least one evaluation parameter with at least one predetermined comparison value; and
assigning to the structure borne sound signal, on the basis of the at least one comparative result, one of a knocking event in the at least one combustion chamber and an interference signal.

14. The internal combustion engine according to claim 13, wherein the controller is further configured for implementing at least one knocking prevention measure if the knocking event is assigned to the structure borne sound signal.

15. The internal combustion engine according to claim 13, further including a knock sensor operably connected to the controller, the knock sensor is configured for detecting the structure borne sound signal.

16. The internal combustion engine according to claim 13, wherein the at least one predetermined comparison value includes at least one threshold value.

17. The internal combustion engine according to claim 16, wherein a knocking signal is assigned to the structure borne sound signal if the at least one evaluation parameter is greater than the at least one predetermined comparison value, and wherein an interference signal is assigned to the structure borne sound signal, if the at least one evaluation parameter is smaller than the at least one predetermined comparison value.

18. The internal combustion engine according to claim 13, wherein the at least one evaluation parameter includes an energy parameter, which is characteristic for an energy contained in the structure borne sound signal, wherein the energy parameter is determined in that the structure borne sound signal is squared, wherein the squared structure borne sound signal is integrated over the predetermined measuring window.

* * * * *

UNITED STATES PATENT AND TRADEMARK OFFICE
CERTIFICATE OF CORRECTION

PATENT NO. : 11,306,694 B2
APPLICATION NO. : 16/876182
DATED : April 19, 2022
INVENTOR(S) : Tobias Frank et al.

Page 1 of 1

It is certified that error appears in the above-identified patent and that said Letters Patent is hereby corrected as shown below:

In the Claims

Column 11
At Line 44 in Claim 7, please delete "claim 6," and substitute therefore --claim 1,--.

Signed and Sealed this
Twenty-third Day of July, 2024

Katherine Kelly Vidal
*Director of the United States Patent and Trademark Office*